Jan. 23, 1940.  W. K. STAFFORD ET AL  2,188,088
COMBINATION SHUT-OFF AND REGULATOR FOR OVENS
Filed Oct. 27, 1938
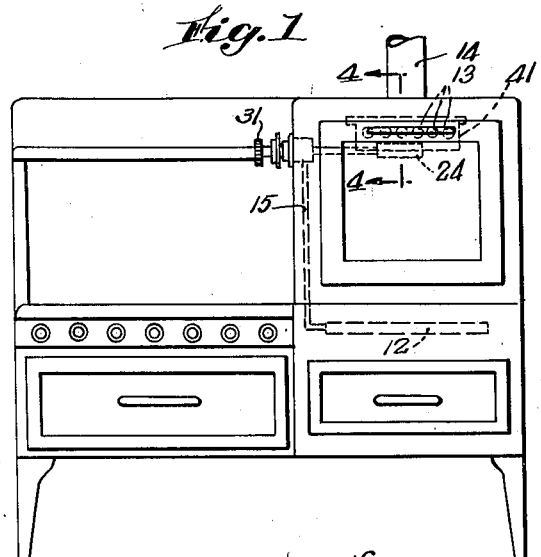
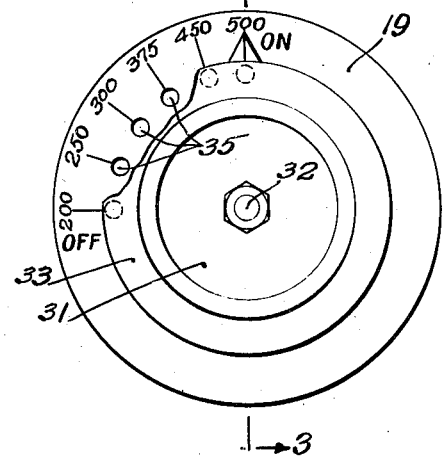
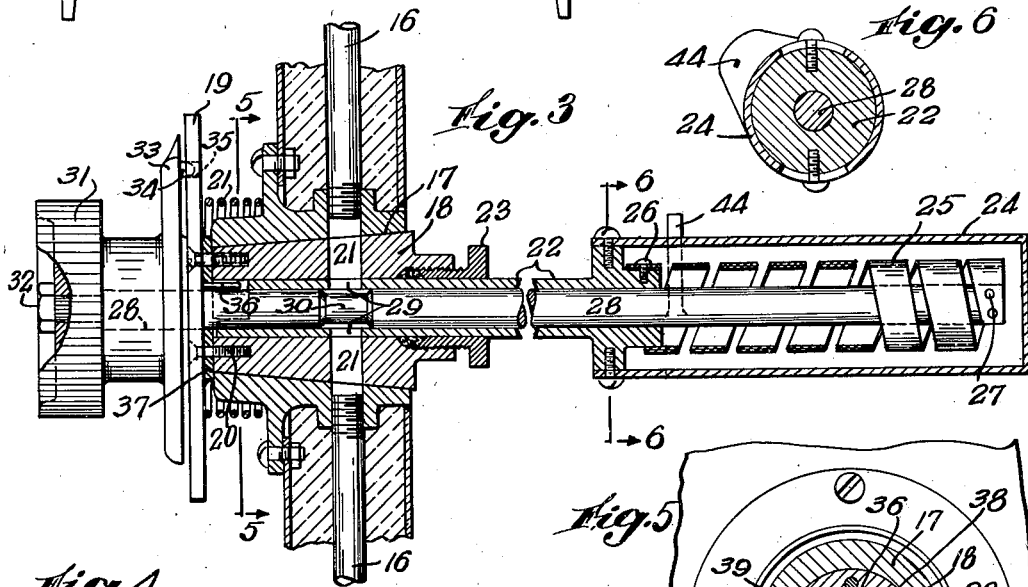
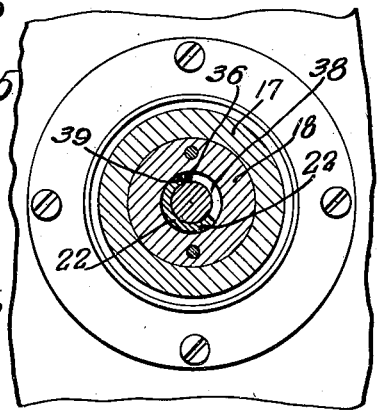
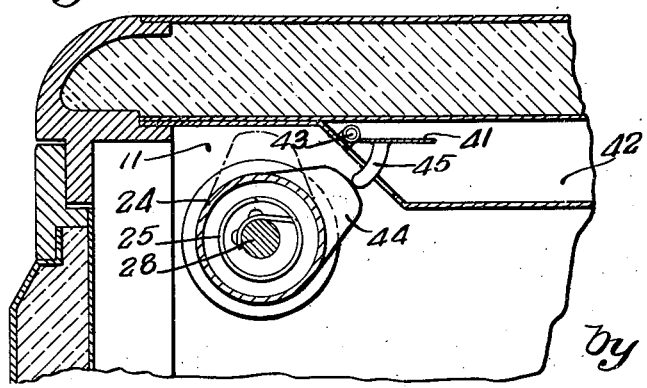
Inventors,
Walter K. Stafford
Frank W. Anderson
by Thomson & Thomson Attys.

Patented Jan. 23, 1940

2,188,088

UNITED STATES PATENT OFFICE 2,188,088

COMBINATION SHUT-OFF AND REGULATOR FOR OVENS

Walter K. Stafford, Newton, and Frank W. Anderson, Boston, Mass., assignors of one-third to Alfred R. Shrigley, Hingham, Mass.

Application October 27, 1938, Serial No. 237,256

3 Claims. (Cl. 236—15)

This invention relates to devices for controlling the fuel supply of heating apparatus having an open flame burner, and pertains more particularly to a combination shut-off and regulator for ovens such as those in gas cooking ranges.

One object of the invention is to provide a simple, compact and efficient control device for manually regulating the fuel supply of the burner and also for automatically adjusting the fuel supply so that the heated medium is maintained at a substantially constant temperature. Another object is to provide such a device with means for automatically varying the velocity of circulation of the secondary air necessary for proper ventilation of the fuel burners, through the automatic adjustment of a damper at a port or ports through which the air is circulated. Further objects reside in the improved features of the combination shut-off and regulator hereinafter described in conjunction with the accompanying drawing, as pointed out in the appended claims.

Although the subject matter of this invention is especially adapted for controlling the gas supply to the oven of a gas range, it will be evident from the following description of that particular adaptation that the invention may be utilized with comparable advantages in connection with other types of gas or oil burning ovens, furnaces, water heaters, or the like where it is desirable that the heated medium (whether air, water, or other fluid) be maintained at a substantially constant and predetermined temperature, or where it is desired to control the rate of circulation of the air consumed or heated by the burners.

In the accompanying drawing,

Fig. 1 is a front view of a gas range having a cooking oven equipped with the improved control devices;

Fig. 2 is an enlarged detail front view of a regulating knob and dial member forming part of the device;

Fig. 3 is a transverse section through the control device (parts of which are shown in elevation) taken on line 3—3 of Fig. 2;

Fig. 4 is an enlarged fragmentary section taken on line 4—4 of Fig. 1 and showing particularly the improved damper control; and Figs. 5 and 6 are sections taken on lines 5—5 and 6—6 respectively of Fig. 3.

In the particular embodiment chosen for the purpose of illustration, the improved control devices are applied to a typical gas range having an insulated heating oven 11 provided with the usual burners indicated diagrammatically at 12, and air vents 13 communicating with the flue pipe 14.

The burners are connected to a gas supply line 15 which includes the pipes 16 of Fig. 3.

As shown in that figure, the pipes 16 are located in the insulated wall of the oven, with a fuel control valve unit inserted in the conduit; but it will be understood that the particular construction or arrangement of the gas conduit or the location and structural details of the valve unit are immaterial to the present invention, except as the structure and arrangement of the control device may be set forth in the appended claims.

The valve unit preferably comprises a housing 17 having unions to receive the threaded ends of the gas pipe 16, and a tapered opening to receive the frusto-conical supply valve 18, the outer or smaller end of said valve is fastened to a plate or disc 19, as by screws 20; and a coiled spring 21 between said plate and the housing 17 tends to hold the valve tightly within its housing. The valve has radial ports 21 which communicate with the pipe 16 to allow free passage of gas therethrough when the ports are brought into registration with the pipe, as shown in Fig. 1; and it will be understood that it is immaterial in which direction the gas may be flowing. It is also evident that when the valve is rotated at 45°, the gas supply is completely shut-off.

Valve 18 has an axial opening therethrough, and a tube or sleeve 22 is received in said opening, the dimensions of the parts being such that the tube is freely rotatable within the valve 18 and within the packing nut 23. The tube 22 projects rearwardly of the valve unit, and carries at its outer end a cylindrical casing 24 for a coiled thermostatic strip 25, one end of which is fastened at 26 to a hub of the sleeve 22. The other end of the thermostatic strip is fastened at 27 to a rod or shaft 28 which extends through and is rotatable within the tube 22.

Sleeve 22 has radial apertures 29 which may be brought into registration with the openings 21 of main valve 18 and with the fuel pipes 16 to permit free passage of gas therethrough; and rod 28 has a circumferential recess 30 in line with the gas conduit, so that it will not interfere with the fuel supply. The outer or forward end of the rod 28 projects through a central opening in the disc 19 and into an axial hole in a knob 31 which is secured to the end of the rod as by a nut 32. The knob has an annular flange or plate 33 normally spaced from the disc 19 and provided with a lug 34, selectively engageable in one of a series of holes 35 spaced circumferentially around a segment of the margin of the disc 19. The knob is normally urged toward the disc by the spring action of the spiral thermostat 25 which yieldingly holds the lug 34 in a selected disc aperture; and the thermostat will contract when the knob is pulled outwardly so that it may be rotated relative to the disc until the lug is opposite the selected aperture.

When the lug is thus selectively engaged with the disc, movement of the knob 31 will rotate the main valve 18 as well as the rod 28, thereby changing the position of the valve ports in the gas line and also rotating the thermostat and the tube 22 to which it is connected.

The rotation of sleeve valve 22 relative to main valve 18 is restricted, however, by a stop pin 36 which is fixed to a washer 37 fastened between the main valve and the disc 19 by the screws 20, and which extends inwardly into a slot or cut-away segment 38 at the end of sleeve 22 (Fig. 5). Hence, when the knob is rotated in a clockwise direction to open the main valve wide, as shown in Figs. 3 and 5, the stop pin 36 engages the shoulder of the cut-away sleeve and prevents further rotation of the sleeve relative to the valve, thereby building up tension in the spiral thermostat 25. The degree of such tension is governed by the initial setting of the knob 31 relative to the disc 19, according to the hole in which the lug 34 is positioned when the main valve is opened.

For this purpose, the holes 35 may have suitable temperature indications, as shown in Fig. 2; and it will be apparent that maximum tension is produced when the lug 34 is engaged in the hole farthest to the right in a clockwise direction; for example, the 500 degree hole as illustrated in the drawing. It will also be understood that when the spiral thermostat is expanded by an increase of temperature in the oven, the tension set up in the thermostat will gradually be overcome and the sleeve will eventually rotate in a counter-clockwise direction, under action of the expanding thermostat, thereby partially to close the ports or apertures 29 of the auxiliary sleeve valve and thus automatically reducing the fuel supply through pipes 16. The thermostat will be so constructed and adjusted, in accordance with common practice, that the ports 29 of sleeve 22 start to close approximately at the temperature set on the indicator disc 19 when the main valve is opened, and as to regulate the position of the auxiliary sleeve valve so that such temperature will be maintained.

The thermostat housing 24 is preferably provided with means for automatically adjusting the position of a damper 41 of an outlet 42 leading to the vents 13 and flue 14 of the oven, thereby to regulate the velocity of circulation of the secondary air in the heated oven and thus further to control and reduce the fuel consumption of the burners by partially closing the damper when the desired temperature has been attained. Various operative connections between the thermostat or its casing 24 and the damper 41 may be provided for this purpose.

In the form herein illustrated by way of example, the damper is pivoted at 43 so that it tends to close by action of gravity, yet is positively opened when the main fuel valve is turned to opened position. To this end, the casing 24 (which rotates with sleeve 22 to which it is attached) is provided with a laterally extending cam arm 44 which is arranged to engage a stud or projection 45 on damper 41. When the main valve is open, as shown, the cam engages the damper stud and lifts the damper to opened position, as indicated by the full lines of Fig. 4; but when the main valve is closed the cam is moved out of such engagement by counterclockwise rotation of the casing 24, and the damper is closed by gravity as shown by the broken line position of Fig. 4.

It will be evident that rotation of the knob 31 in a direction to open the main valve will necessarily open the damper; for if the damper sticks, the cam will bind against stud 45 and the knob cannot be turned. It will also be understood that any movement of the thermostat which is effective to rotate the auxiliary sleeve valve will also turn the cam 44 and thus cause the damper to close or partially close automatically, when the desired oven temperature has been reached. This thermostatic damper control, coupled with the automatic fuel control, effects a substantial economy in fuel consumption by retarding rapid cooling of the oven which necessarily occurs when heated air is permitted to escape through open vents, while at the same time ensuring ample circulation for proper combustion at the burners. It also assists materially in maintaining an even temperature within the oven and a more uniform gas supply.

The operation of the control devices will be evident from the foregoing description and it will be understood that suitable stops (not shown) to limit the rotation of the disc 19 may be provided at the "off" and "on" positions indicated in Fig. 2. When the oven is to be heated, that disc and the main or shut-off valve 18 to which it is attached are turned fully "on"; and the temperature setting of the knob 31 relative to the disc may be adjusted either before or after the main valve is opened. Whatever the setting, the auxiliary sleeve valve is also fully opened by this action, for the temperature setting merely controls the tension which is initially exerted on the resilient, spiral thermostat, and the stop pin 36 ensures registration of the ports of the main and auxiliary valves.

Having thus disclosed a recommended embodiment of our invention, we claim:

1. A combination shut-off and fuel regulator for heating apparatus having an open-flame burner and a fuel supply conduit leading thereto, comprising a tubular main valve disposed in the conduit, an auxiliary sleeve valve passing through and movable in the main valve, each of said valves being conjointly operable and independently effective to control the fuel supply, a coiled spring thermostat disposed in the medium to be heated and fixed to the auxiliary valve so that the effective position of the matter is automatically adjusted as a consequence of heat-responsive movement of the thermostat, a rotatable shaft fixed to the thermostat so that rotation of the shaft turns the auxiliary valve as well as the thermostat, a knob attached to the shaft and detachably engageable with the main valve for simultaneously rotating the same, thereby to regulate the initial setting of the main valve, the sleeve valve and the thermostat, and a stop member engaging the sleeve valve to limit the rotation of the auxiliary valve relative to the main valve when the latter is opened, so that an initial tension tending to hold the sleeve valve open is imparted to the coiled thermostat at such initial setting, whereby said valve will not move toward closing position until after said tension has been overcome by heat-responsive movement of the thermostat.

2. A combination shut-off and fuel regulator for gas ovens, comprising a tubular main valve in the fuel supply line, an auxiliary sleeve valve passing through and rotatable in the main valve, a shaft extending through the sleeve valve, a knob on one end of the shaft, a coiled thermostat fixed at one end to the shaft and at its opposite end to the sleeve, a stop pin engaging the sleeve for limiting its movement relative to the main valve when the latter is opened, and a knob connected directly to the shaft and detachably engageable with the main valve for fully opening both valves and thereby setting up an initial tension in the thermostat, said tension tending to hold the auxiliary valve open and the effective position of the auxiliary valve being automatically adjusted by heat responsive movement of the thermostat after said tension has been overcome by such movement.

3. A combination shut-off and fuel regulator for gas ovens, comprising a tubular main valve in the fuel supply line, an auxiliary sleeve valve passing through and rotatable in the main valve, a shaft extending through the sleeve valve, a knob on one end of the shaft, a coiled thermostat fixed at one end to the shaft and at its opposite end to the sleeve, a stop pin engaging the sleeve for limiting its movement relative to the main valve when the latter is opened, a knob connected directly to the shaft and detachably engageable with the main valve for fully opening both valves and thereby setting up an initial tension in the thermostat, the effective position of the auxiliary valve being automatically adjusted by heat responsive movement of the thermostat after said tension has been overcome by such movement, the oven having an air vent, a damper associated with said vent for controlling the velocity of circulation of secondary air through the oven, a casing surrounding the thermostat and fixed to the sleeve, the casing having a cam operatively engaging the damper so that the position of the damper is automatically regulated by heat-responsive movement of the thermostat and so that the damper is positively opened when the sleeve valve is opened.

WALTER K. STAFFORD.
FRANK W. ANDERSON.